March 22, 1960 C W. MUSSER 2,929,266
STRAIN-WAVE GEARING-TUBULAR SHAFT
Original Filed March 21, 1955 2 Sheets-Sheet 1
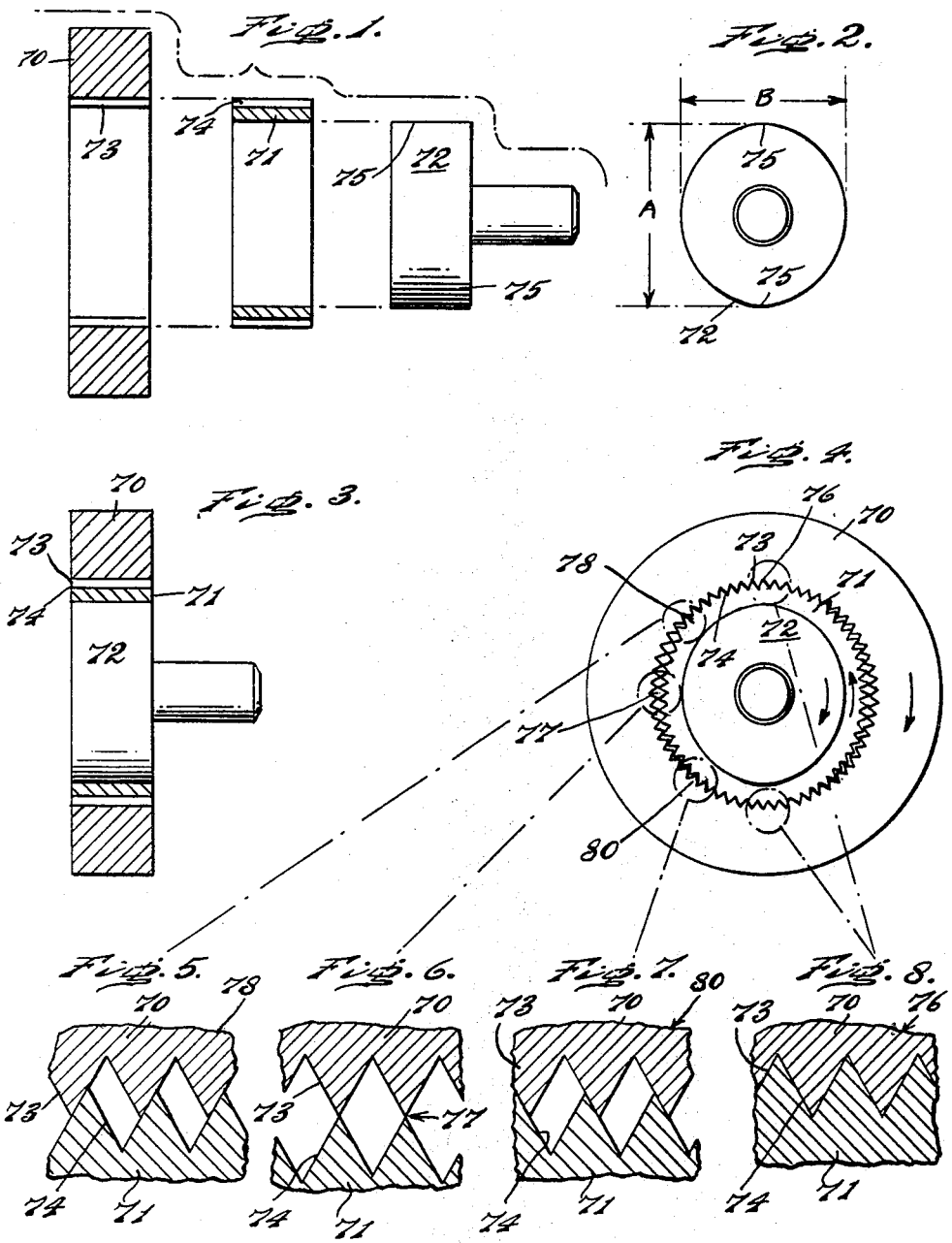
INVENTOR.
C. Walton Musser
BY
ATTORNEYS.

March 22, 1960   C W. MUSSER   2,929,266
STRAIN-WAVE GEARING-TUBULAR SHAFT
Original Filed March 21, 1955   2 Sheets-Sheet 2
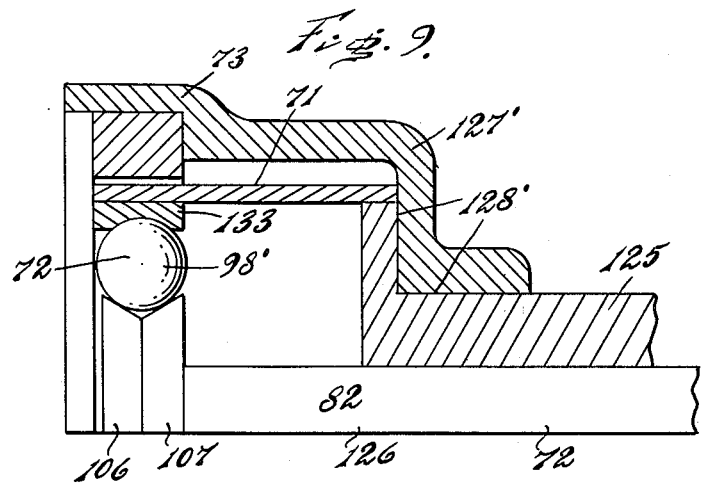
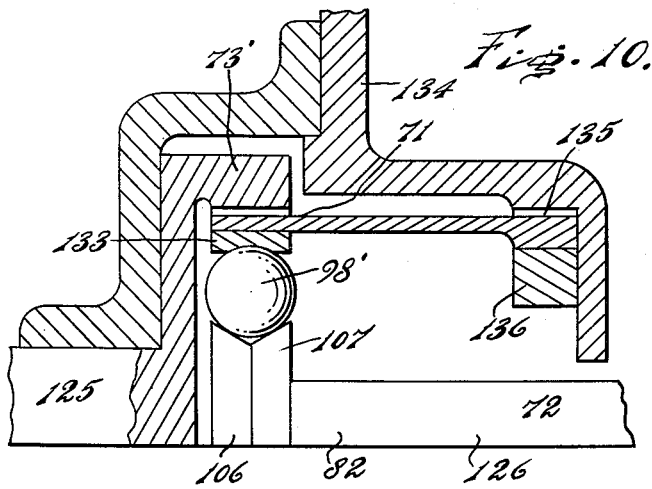
INVENTOR
C. Watton Musser
BY
ATTORNEYS.

United States Patent Office 2,929,266
Patented Mar. 22, 1960

2,929,266

STRAIN-WAVE GEARING-TUBULAR SHAFT

C Walton Musser, Beverly, Mass., assignor to United Shoe Machinery Corporation, Boston, Mass., a corporation of New Jersey Original application March 21, 1955, Serial No. 495,479, now Patent No. 2,906,143, dated September 29, 1959. Divided and this application March 23, 1959, Serial No. 801,195

8 Claims. (Cl. 74—640)

The present invention relates to motion transmitting mechanism, and particularly to gearing in which relative motion occurs between an internal gear and a cooperating external gear.

The present application relates to species of my copending patent application Serial No. 495,479, filed March 21, 1955, for Strain Wave Gearing, now U.S. Patent No. 2,906,143, granted September 29, 1959, which is incorporated herein by reference. The reader is referred to this patent for an understanding of the background and of the theory. The subject matter included is the form in which the input and output relatively surround one another, and the form of Figure 48 of the parent patent application.

The species of the parent application relating to the dual form and to the electromagnetic strain-inducer is embodied in my copending application Serial No. 656,672, filed May 2, 1957, for Dual Strain Wave Gearing.

A purpose of the invention is to secure relative motion between cooperating internal and external gears, by propagating a strain wave which advances an area of contact or preferably a plurality of areas of contact between the respective gears.

A further purpose is to provide a coaxial relationship between input and output in a gearing system.

A further purpose is to avoid difficulty from problems relating to center distance.

A further purpose is to produce a gearing system which is insensitive to misalignment between input and output.

A further purpose is to obtain differential motion which is insensitive to eccentricity and to tooth shape.

A further purpose is to distribute the input stresses at a different location from the output stresses in a gearing system.

A further purpose is to provide an input and an output which relatively surround one another and desirably to use a strain gear which is an elongated tube.

Further purposes appear in the specification and in the claims.

In the drawings I have chosen to illustrate a few only of the numerous embodiments in which my invention may, appear selecting the forms shown from the standpoints of convenience in illustration, satisfactory operation, and clear demonstration of the principles involved.

Figure 1 is an exploded axial section of a device for transmitting motion according to the present invention, in a simplified form.

Figure 2 is a right end elevation of the strain inducer shown in Figure 1.

Figure 3 is an axial section corresponding generally to the exploded section of Figure 1, but showing the parts assembled in their normal operating relationship.

Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figure 9 shows in fragmentary axial section a single form as opposed to a dual form of strain wave gearing in accordance with the invention.

Figure 10 shows in fragmentary axial section a modification in the form of Figure 9.

Describing in illustration, but not in limitation and referring to the drawings:

General features of invention

The present invention is concerned with eliminating difficulties encountered in conventional gearing, as will be explained more in detail later. The present invention deals particularly with gearing of a character in which inner and outer concentric gears are brought into mating relationship in a plurality of spaced areas, with interspersed areas in which they are not in mating relationship, and the areas of mating relationship are propagated forward in a wave which for the purposes of the present invention is described as a strain wave, since it represents a wave deflection in one of the gearing elements.

This strain wave is actually superimposed on the circumference of one or both of the gears, and travels with respect to it at a rate which is determined by the rate of application of load or rotatory force to the mechanism.

It should be appreciated that in the mechanism of the present invention, unlike all ordinary gearing, two cooperating gears move into and out of tooth engagement by radial motion of the teeth of one gear with respect to the other, without in the least necessitating any change in the gear axis. It will be evident, therefore, that this action presupposes a motion of parts of one of the gears with respect to the other parts which can be accomplished in any suitable manner, but preferably will be achieved by deflecting an elastic material, which may be for example an elastomer such as rubber, synthetic rubber, nylon, or other plastic, or a metal such as steel, bronze, or other gear material, moving within the elastic limit, and thereby substantially free from plastic deformation.

Principles of operation

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing."

In order to understand the motion of the gear teeth, reference is made to Figures 1 to 8 inclusive, in which the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two, using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 8 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the pitch line of the teeth at the major axis equal to the pitch diameter of the ring gear as shown at 76 in Figures 4 and 8. At the position as shown in Figure 8 the pitch circles of the two gears are coincident. At the minor axis the pitch line of the strain gear teeth is smaller than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

Balanced forces

Since all of the forces necessary to produce torque are distributed at the pitch lines of both gears at a number of equal points equal to the number of lobes on the strain inducer, they tend to balance out and become equal. This effectively prevents any radial forces being inserted on the output shaft bearing as these tend to be self-centering. The same condition prevails on the input since the strain inducer also exerts its radial forces at a number of places equally spaced. All of the active forces within the strain wave gearing system are balanced so that they tend to produce only the desired result—the transmission of torque.

No load on bearings

All of the forces within strain wave gearing are counterbalanced as discussed above in reference to balanced forces. Consequently a strain wave gearing system can be made to operate without bearings on either the input or the output. The forces all tend to be self-centering. Several models of strain wave gearing applied to motors have used this centering tendency as the motor bearing for one end of the armature. Therefore the bearings that are used on a strain wave gearing system are only to enclose the mechanism and withstand forces applied from the outside.

Torsional rigidity of output

The output shaft can be directly coupled to the driving gear at its outside diameter. This driving gear in turn can be "keyed" to the stationary gear by 55 percent of the teeth which are engaged. The torsional rigidity can therefore be made equal to a short tube with the wall thickness, length and diameter equal to those of the strain gear. A short tube has the greatest torsional rigidity of any type section of its size, weight and material.

Coaxial input-output

In this respect the strain wave gearing system is similar to epicyclic gearing but dissimilar to other types of gear reducers. However, due to its small size the strain wave gearing system is ideally suited for a reduction unit within and a part of an electric motor. It is also of great utility on scientific instrument control shafts where either the whole gear unit can be turned for fast control or the coaxial input for vernier or slow control.

No center distance problems

Strain wave gearing does not depend on the accurate location and alignment of shaft centers to obtain proper tooth engagement. Input is coaxial with the output and all forces are inherently balanced to automatically assure this coaxiality.

Insensitive to misalignment

Misalignment of the face of the strain gear in relation to the face of the ring gear is relatively unimportant due to the low tooth contact pressure and low shear stresses in the teeth.

In Figure 9 the strain gear is a short thin walled tube which has teeth at the outside at one end and is secured at the other end by any conventional means to the flange of tubular output shaft 125. The flexibility of the tube permits the gear portion to be deflected as if it were a simple ring. Since the deflection is small, the length of tube necessary to absorb the bending stresses is relatively short. The torque transmitting ability of a relatively short tube is so large that a very thin wall can be used on such a tube to reduce the bending stresses. Coupling between the strain gear and the tubular output shaft is rigid and direct, with no discontinuity such as a spline. There is an exterior raceway 133 secured on the interior of the strain gear, which is deflected by the walls 98' which are in turn manipulated in a noncircular path as already explained by an internal raceway 106, 107 consisting of axially separate and adjustable units, the internal raceway having two or three or another suitable number of equally circumferentially spaced lobes. The strain inducer may be of any one of the constructions described in Figures 1 to 10 inclusive, and is not necessarily limited to the ball bearing type as illustrated.

In Figure 9 it will be noted that the input 126 and the output 125 are on the same side, the output surrounding the input. The housing 127' provides bearing surfaces 128' for the output as will be noted.

In Figure 10 the output is shown at 125 and the input at 126. In this form the ring gear is the driven element.

It will be noted that when the ring gear is the driven element, the output rotation is in the same direction as the input and when the strain gear is the driven element the output rotation is in the opposite direction to the input.

In the form of Figure 10, the strain gear is stationary, being held by housing 134 and the ring gear 73' as just explained is the driven element. The strain gear in this form has teeth at one end meshing with the ring gear 73', and at the other end has splines 135 which are interconnected with cooperating splines on the inside of the housing. The splines can suitably be of the same size and shape as the gear teeth and if desired can be broached at that time. They are forcibly held engaged with the splines on the housing desirably by locking ring 136 which engages the inside of the tubular strain gear at the spline end and is secured to the housing 134. If desired, the locking ring can perform bearing functions for guiding the input shaft. In this construction the ring gear is desirably made integral with the output shaft and rotates in the same direction as the input. This arrangement would seem to present the least fastening problems for all of the parts and its construction is conducive to optimum use of all of the distinctive features of strain wave gearing.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a device for transmitting motion, a first gear, a second gear inside the first gear, of different diameter from the first gear, having teeth of the same size as the first gear, concentric therewith and having a deflectable wall, the second gear comprising an elongated tube having mounting at one end and having the teeth at the other end intermeshing with the teeth on the inside of the first gear, a strain inducing element inside the tubular second gear operative to deflect the second gear, and maintaining the second gear deflected into mating relation of its teeth with the teeth of the first gear on the concentric axis at a plurality of circumferentially spaced positions interspaced by nonmating positions, and means for moving the operative relationship of the strain inducing element relative to the periphery of the second gear and thereby propagating a strain wave around the periphery of the second gear and causing relative rotation of one of the first and second gears with respect to one another.

2. A device of claim 1, in which the second gear is stationary and the first gear constitutes the output.

3. A device of claim 1, in combination with a housing and splines interconnecting the housing with the end of the second gear remote from the gear teeth.

4. A device of claim 1, in which the strain inducer comprises an internal race, an external race in spaced relation to the internal race and antifriction bearing elements between the internal and external races mating therein.

5. In a device for transmitting motion, a first gear, a second gear of different diameter from the first having teeth of the same size as the first gear, concentric therewith and forming a deflectable wall, a strain inducing element operative to deflect the second gear, and maintaining the second gear deflected into mating relation of its teeth with the teeth of the first gear on the concentric axis at a plurality of circumferentially spaced positions interspaced by nonmating positions, and means for moving the operative relation of the strain inducing element relative to the periphery of the second gear and thereby propagating a strain wave around the periphery of the second gear and causing relative rotation of the second gear with respect to the first gear, including an input connected to the strain inducer and an output concentric with the input at the same end of the device and connected to the second gear.

6. A device of claim 5, in which the output is on the outside and the input is surrounded by the output.

7. A device of claim 5, in combination with a housing, bearing means on the housing journalling the output, and means on the housing holding the first gear stationary.

8. A device of claim 7, in which the strain inducing element comprises inner and outer races within the second gear and antifriction bearing elements within the races, the inner race being connected to the input.

No references cited.